(12) United States Patent
Chen et al.

(10) Patent No.: US 11,788,845 B2
(45) Date of Patent: Oct. 17, 2023

(54) SYSTEMS AND METHODS FOR ROBUST SELF-RELOCALIZATION IN A VISUAL MAP

(71) Applicants: Baidu USA, LLC, Sunnyvale, CA (US); Baidu.com Times Technology (Beijing) Co., Ltd., Beijing (CN)

(72) Inventors: Mingyu Chen, Santa Clara, CA (US); Yingze Bao, Mountain View, CA (US); Xin Zhou, Mountain View, CA (US); Haomin Liu, Beijing (CN)

(73) Assignees: Baidu USA LLC, Sunnyvale, CA (US); Baidu.com Times Technology (Beijing) Co., Ltd., Beijing (CN)

( * ) Notice: Subject to any disclaimer, the term of this patent is extended or adjusted under 35 U.S.C. 154(b) by 216 days.

(21) Appl. No.: 16/770,614

(22) PCT Filed: Jun. 29, 2018

(86) PCT No.: PCT/CN2018/093743
§ 371 (c)(1),
(2) Date: Jun. 7, 2020

(87) PCT Pub. No.: WO2020/000395
PCT Pub. Date: Jan. 2, 2020

(65) Prior Publication Data
US 2020/0309534 A1  Oct. 1, 2020

(51) Int. Cl.
*G01C 21/30* (2006.01)
*G05D 1/00* (2006.01)

(52) U.S. Cl.
CPC ........... *G01C 21/30* (2013.01); *G05D 1/0088* (2013.01)

(58) Field of Classification Search
CPC .... G01C 21/30; G01C 21/005; G05D 1/0088; G05D 1/0246; G05D 1/0274;
(Continued)

(56) References Cited

U.S. PATENT DOCUMENTS 10,393,515 B2 * 8/2019 Kawanishi ............ G01S 7/4808
10,571,926 B1 * 2/2020 Zhang .................. G05D 1/0274
(Continued)

FOREIGN PATENT DOCUMENTS

| CN | 104736964 A | 6/2015 |
| CN | 105425808 A | 3/2016 |

(Continued)

OTHER PUBLICATIONS

International Search Report, dated Mar. 29, 2019, in International Application No. PCT/CN2018/093743, filed Jun. 29, 2018. (4pgs).
(Continued)

*Primary Examiner* — Abby Y Lin
*Assistant Examiner* — Esvinder Singh
(74) *Attorney, Agent, or Firm* — NORTH WEBER & BAUGH LLP

(57) ABSTRACT

Described herein are systems and methods that improve the success rate of relocalization and eliminate the ambiguity of false relocalization by exploiting motions of the sensor system. In one or more embodiments, during a relocalization process, a snapshot is taken using one or more visual sensors and a single-shot relocalization in a visual map is implemented to establish candidate hypotheses. In one or more embodiments, the sensors move in the environment, with a movement trajectory tracked, to capture visual representations of the environment in one or more new poses. As the visual sensors move, the relocalization system tracks various estimated localization hypotheses and removes false ones until one winning hypothesis. Once the process is finished, the relocalization system outputs a localization result with respect to the visual map.

20 Claims, 5 Drawing Sheets

(58) Field of Classification Search
CPC ... G05D 1/0231; G05D 1/0253; B25J 13/089; B25J 19/021; G06T 7/70; G06T 7/73; G06T 7/74; G06T 7/0002; G06T 7/001; G06T 7/20; G06T 7/246; G06T 7/248

See application file for complete search history.

(56) References Cited

U.S. PATENT DOCUMENTS

| | | | |
|---|---|---|---|
| 2002/0049530 A1* | 4/2002 | Poropat | G01S 5/16 701/23 |
| 2004/0167667 A1* | 8/2004 | Goncalves | G05D 1/0272 700/250 |
| 2008/0167814 A1* | 7/2008 | Samarasekera | H04N 13/243 701/469 |
| 2016/0152241 A1* | 6/2016 | Denda | G05D 1/0274 701/23 |
| 2017/0300061 A1 | 10/2017 | Hickerson et al. | |
| 2018/0253107 A1* | 9/2018 | Heinla | G05D 1/0088 |
| 2019/0138026 A1* | 5/2019 | Park | G06V 20/64 |
| 2019/0325600 A1* | 10/2019 | Balan | G06F 3/011 |
| 2021/0174539 A1* | 6/2021 | Duong | G06N 5/003 |
| 2021/0339393 A1* | 11/2021 | Dan | B25J 9/126 |

FOREIGN PATENT DOCUMENTS

| | | |
|---|---|---|
| CN | 105652871 A | 6/2016 |
| CN | 106092104 A | 11/2016 |
| CN | 106885574 A | 6/2017 |
| CN | 107869989 A | 4/2018 |
| CN | 107990899 A | 5/2018 |
| CN | 108052101 A | 5/2018 |
| WO | 2013148077 A1 | 10/2013 |
| WO | 2015103536 A1 | 7/2015 |
| WO | 2017172778 A1 | 10/2017 |

OTHER PUBLICATIONS

Written Opinion of the International Searching Authority, dated Mar. 29, 2019, in International Application No. PCT/CN2018/093743, filed Jun. 29, 2018. (4pgs).

Galvez-Lopez et al., "Bags of Binary Words for Fast Place Recognition in Image Sequences," In IEEE Transactions an Robotics, vol. 28, Issue: 5, Oct. 2012. (9 pgs).

Chinese Office Action dated Feb. 22, 2023, in Chinese Application No. 201880057251.X (21pgs).

Notification of Granting Invention Patent Right, dated Jul. 28, 2023, in Chinese Application No. 201880057251.X (9 pgs).

\* cited by examiner

SYSTEMS AND METHODS FOR ROBUST SELF-RELOCALIZATION IN A VISUAL MAP

CROSS-REFERENCE TO RELATED APPLICATIONS

This patent application is filed pursuant to 35 USC § 371 as a US National Phase Application of International Patent Application No. PCT/CN2018/093743, filed on Jun. 29, 2018, entitled "SYSTEMS AND METHODS FOR ROBUST SELF-RELOCALIZATION IN A PRE-BUILT VISUAL MAP," listing Mingyu Chen, Yingze Bao, Xin Zhou, and Haomin Liu as inventors, which patent document is incorporated by reference herein in its entirety and for all purposes.

TECHNICAL FIELD

The present disclosure relates generally to systems and methods for self-relocalization with improved performance, features, and uses.

BACKGROUND

Localization within a map is critical to any location-based applications to work in a known environment. A map may be built from recordings beforehand or from simultaneous localization and mapping (SLAM). Depending on the sensor used, the visual map representation varies. For instance, a LIDAR system results in a map of two-dimensional (2D)/three-dimensional (3D) point clouds. A depth sensor results in a map of dense 3D volumetric representation points. A camera system results in a map of visual representation of the environment, which may include sparse 3D points, semi-sparse edges and facets, or dense 3D reconstruction.

Relocalization typically involves finding a 6-degree of freedom (6-DOF) pose in space or 3-DOF pose in plane with respect to a pre-built map. Visual relocalization usually requires enough overlapped visual representations between the current scene and the visual map. Relocalization may fail for various reasons. First, the environment may have significantly changed and cause mismatches between what the sensor observes and the built visual map at the same location. Second, the visual map may have similar representations to cause local ambiguity for the localization. Third, the sensor may be facing a viewing angle that has never been observed when constructing the map, which is common to directional sensors, e.g., cameras and depth sensors. It is very challenging to resolve the problems above with traditional relocalization methods that use a snapshot of visual measurement for relocalization.

Accordingly, what is needed are systems and methods that improve the successful rate of relocalization and eliminate the ambiguity of false relocalization by exploiting motions of the sensor system.

SUMMARY

An objective of the present disclosure is to propose an improved system and methods for self-relocalization in a pre-built visual map, to solve the technical problems mentioned in the foregoing Background section.

In a first aspect, the present disclosure provides a method for self-relocalization in a pre-built visual map, including: capturing a snapshot using at least one visual sensor at an initial pose; establishing a plurality of relocalization hypotheses in the visual map based at least on the snapshot; moving the at least one visual sensor from the initial pose to a new pose with a movement trajectory tracked; taking additional visual measurement at the new pose; and implementing hypotheses refinement by using at least one of the movement trajectory and the additional visual measurement, to reject one or more relocalization hypotheses.

In a second aspect, the present disclosure provides a system for self-relocalization in a pre-built visual map, including: at least one visual sensor for visual measurement; a motion system to move the at least one visual sensor; a processor coupled to the at least one visual sensor and the motion system; a non-volatile memory storing one or more instructions, when executed by the processor, causing the processor to perform the following operations: instructing the at least one visual sensor for visual measurement at a first pose; implementing single-shot relocalization to localize the system with respect to a pre-built visual map using the visual measurement at the first pose, the localization result including candidate relocalization hypotheses of the at least one visual sensor at the first pose in the pre-built visual map; instructing the motion system to move the at least one visual sensor from the first pose to a second pose with a movement trajectory tracked; instructing the at least one visual sensor for visual measurement at the second pose; and implementing hypotheses refinement, by using at least one of the tracked movement trajectory and the additional visual measurement, to reject one or more relocalization hypotheses.

In a third aspect, the present disclosure provides a method for self-relocalization in a pre-built visual map, including: capturing a first snapshot using at least one visual sensor at a first pose; implementing single-shot relocalization to localize at least one visual sensor in a pre-built visual map based at least on the first snapshot, the single-shot relocalization establishing a plurality of relocalization hypotheses of the at least one visual sensor at the first pose; moving the at least one visual sensor from the first pose to a second pose with a movement trajectory tracked; fusing the tracked movement trajectory with each of the plurality of relocalization hypotheses to obtain one or more potential end poses in the pre-built visual map; and implementing hypotheses refinement by using at least the movement trajectory, to reject one or more established relocalization hypotheses, wherein if the tracked movement trajectory starting from one of the plurality of relocalization hypotheses is incompatible with the pre-built visual map, the relocalization hypothesis is rejected.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures are not to scale.

DETAILED DESCRIPTION OF EMBODIMENTS

Figure 1:
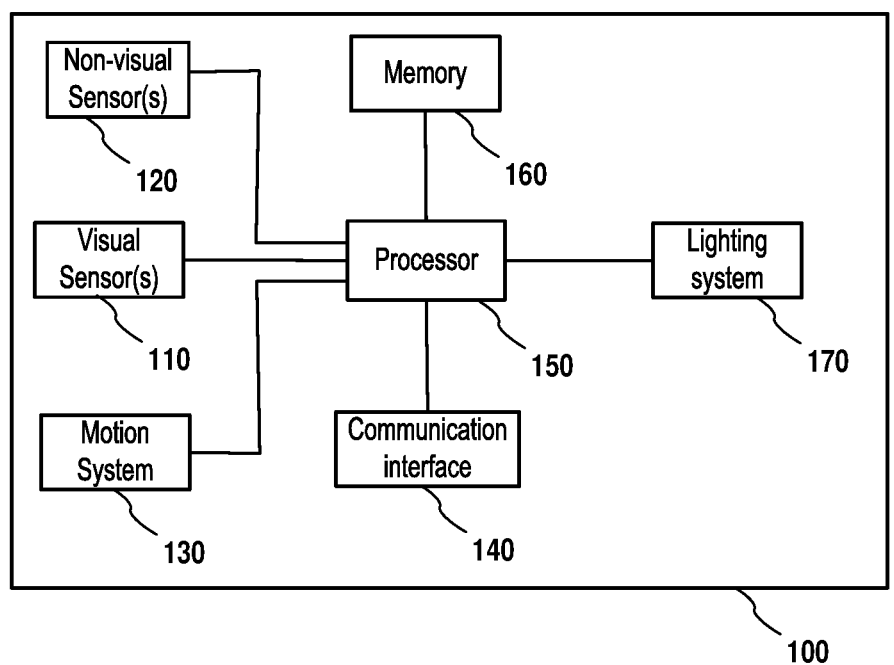
FIG. 1 depicts a system for self-relocalization according to embodiments of the present document.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Although embodiments described herein may be within the context of images (or snapshots), which may be still images or image frames from video, inventive elements of the current patent document are not so limited. Accordingly, aspects of the disclosure elements may be applied or adapted for use in other contexts and/or on other input sensor data. It shall also be noted that image may comprise image information from vision sensors that is not visible to human eyes, such as from infrared sensors; and it shall also be noted that references to non-visual sensors means non-vision-based sensors.

The terms "include," "including," "comprise," and "comprising" shall be understood to be open terms and any lists the follow are examples and not meant to be limited to the listed items. The phrase "real-time" shall be understood to mean real-time or near real-time as processing typically introduces or includes some delays. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. INTRODUCTION

In various applications, including autonomous driving and robotic applications, precise relocalization is important for decision making and path planning. It is challenging to accomplish precise and robust relocalization for various reasons. First, the environment may have significantly changed and cause mismatches between what the sensor see and the built visual map at the same location. Second, the visual map may have similar representations to cause local ambiguity for the localization. Third, the sensor may be facing a viewing angle that has never been observed when constructing the map, which is common to directional sensors, e.g., cameras and depth sensors. It is very challenging to resolve the problems above with traditional relocalization methods that uses a snapshot of visual measurement for relocalization.

Various efforts have been done to improve relocalization accuracy and robustness. FAB-MAP, published in 2008 and improved in 2012 by Mobile Robotics Group from University of Oxford, is an appearance-based SLAM system that builds a probability model of visual vocabulary for image retrieval and localization. Dorian Galvez-Lopez discloses a method using Bag of Words (BoW) to convert images into a bag-of-word representation. It implements the hierarchical tree for approximating nearest neighbors in the image feature space for fast retrieval.

FAB-MAP and BoW may both be considered image-based relocalization methods, which first find the most alike image in a visual map. Common computer vision techniques are then used to compute the relative pose (image-to-image) or absolute pose (i.e., using Perspective-n-Point (PnP)) to find the relocalization result. The relocalization accuracy highly depends on image retrieval accuracy. Some methods have been proposed for temporal/spatial consistency check to remove false positives of image retrieval, but still fall into the category of the one-shot approach that does not take advantages of the sensor system motion and multiple hypotheses.

Iterative closest point (ICP) is an algorithm to minimize the differences between two point clouds. ICP is a core algorithm for (re)localization for LIDAR/depth-based sensor system that constructs a dense 2D/3D point cloud representation of the visual map. Using ICP for localization usually requires a reasonable initial guess, which may be difficult to do relocalization without enough prior information. Without a good initial guess, ICP may not converge and hence the relocalization may fail.

B. EMBODIMENTS OF SELF-RELOCALIZATION SYSTEMS

FIG. 1 depicts a self-relocalization system 100 for self-relocalization according to embodiments of the present document. In one or more embodiments, the system 100 incorporates one or more visual sensors 110 for visual image capturing, a motion system 130 to move (translate and/or rotate) the sensors to capture additional images in a pose (position and/or orientation) different from previous poses. In one or more embodiments, the system 100 comprises at least one processor system 150 coupled to the visual sensors 110 and motion system 130. The processor 150 receives data from the visual sensors 110 and implements a self-relocalization algorithm based on instructions stored in a non-volatile memory 160. The processor 150 may instruct the motion system 130 to perform a desired motion to capture additional images during the self-relocalization process. The motion system 130 may comprises mechanic or electric component to enable a physical movement (e.g., a 6-DOF movement, or 3-DOF movement for a wheeled robot) for at least one visual sensor to move into a different pose. The one or more visual sensors 110 may be a regular camera, a thermal imaging camera, a depth sensor, or a Light Detection and Ranging (LIDAR) sensor, or a combination thereof.

In embodiments, the self-relocalization system 100 may further comprise one or more non-visual sensors 120, such as an inertial measurement unit (IMU), Ultra-Wideband (UWB) system, a Global Positioning System (GPS) receiver, a wheel encoder, etc., to provide non-visual information to the processor. These non-visual sensors may be used to provide relative and/or global position information for sensor fusion and facilitate relocalization hypotheses establishing and refining by rejecting obvious false hypotheses. For example, the UWB may be used to receive one or more Wi-Fi beacon signals to assist positioning. In embodiments, the self-relocalization system 100 may further comprise a communication interface 140 to external communication for various purposes, such as remote control, data transmission, etc. In embodiments, the self-relocalization system 100 may further comprise a lighting system including one or more lights to provide illumination for desired visual images.

In embodiments, during relocalization process, the one or more visual sensors 110 move (or the entire system 100 moves to which the visual sensors are attached) with a pre-defined pattern or explores an environment with desired motion, e.g., translation and rotation, to capture visual representations of the environment to have enough overlap with the visual map. As the one or more visual sensors 110 move, the relocalization system tracks various estimated localization hypotheses and removes false ones until only a winning hypothesis remains. In one or more embodiments, a confidence level, which may be adjusted, is used to determine when the relocalization process is finished. Once the process is finished, the relocalization system outputs a localization result with respect to the visual map. In one or more embodiments, the confidence level may be derived from the uncertainty of the estimated relocalization pose, or heuristically calculated from the cost of the relocalization optimization problem, e.g., the reprojection error.

In one or more embodiments, the system 100 may incorporate or comprise a computing system, or portions thereof, which are described below with reference to FIG. 5.

C. EMBODIMENTS OF SELF-RELOCALIZATION PROCESSES

Figure 2:
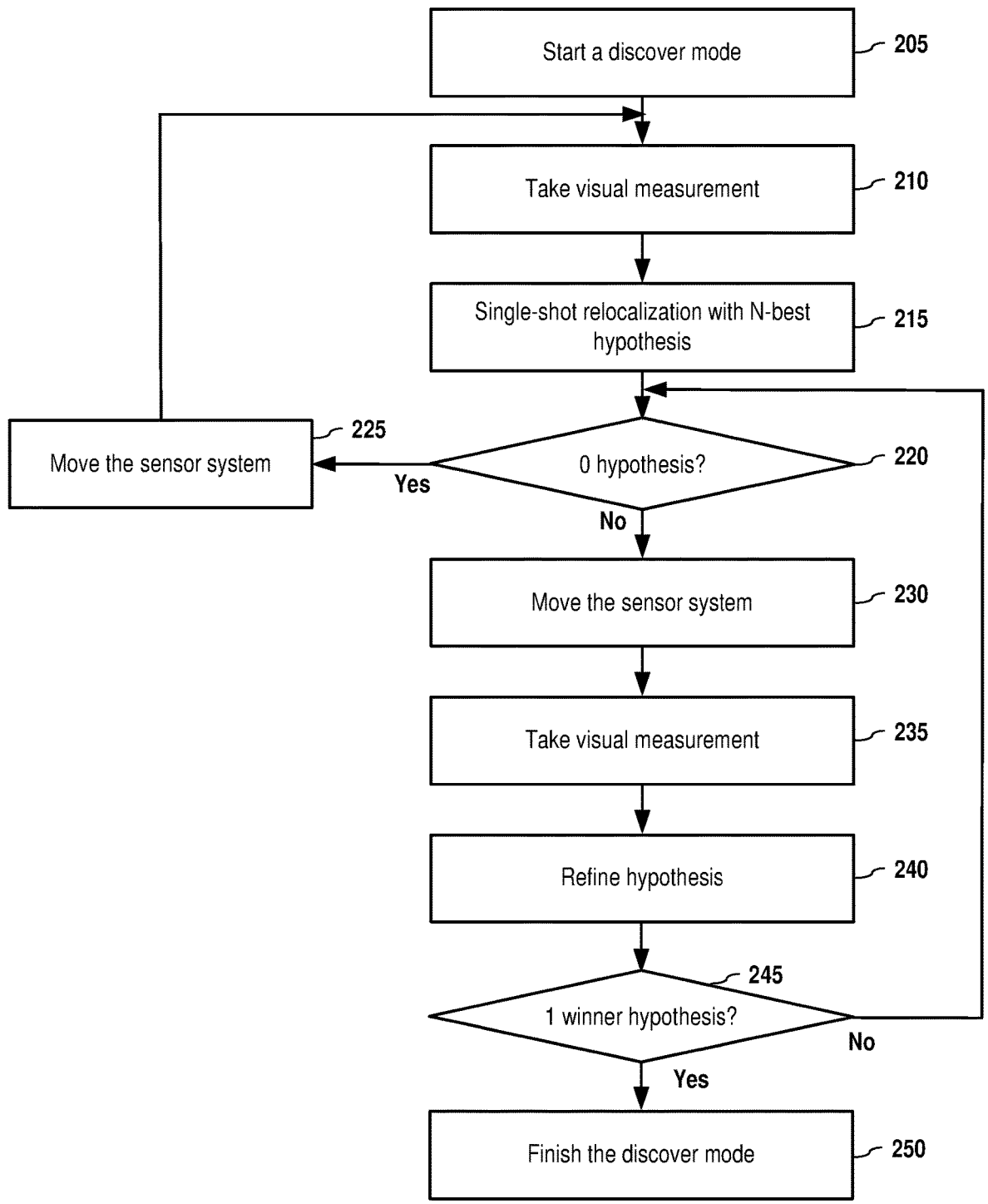
FIG. 2 depicts a process for self relocalization, according to embodiments of the present document.

FIG. 2 depicts a process for self-relocalization, according to embodiments of the present document. The process starts at step 205, in which the self-relocalization system starts a discover mode. In one or more embodiments, the location of the sensor system relative to or within a pre-built visual map is unknown at this state. A snapshot of available sensor measurement is captured (210) at a current pose of the sensor system. In one or more embodiments, a single-shot relocalization method is used (215) to localize the self-relocalization system with respect to the visual map. For example, in one or more embodiments, features mapping between features in an image captured by the sensor system (which may be referred to as a query image) may be compared against features in a set of key image frames of the visual map. In one or more embodiments, the relocalization pose is computed from either the relative pose between the query image and the reference key frame or estimated directly from the absolute pose of the query image against the pre-built map. In one or more embodiments, the single-shot relocalization result is evaluated (220) to determine whether a relocalization hypothesis match or matches were found in the visual map. For example, a determination is made whether a set of features in the query image matches at or beyond a threshold level with sets of features in one or more candidate key frames of the visual map.

In one or more embodiments, the sensor snapshot information may also include sensor information from non-visual (i.e., non-image-based) sensors, such as UWB or GPS. In one or more embodiments, this non-vision-based sensor data may be used to identify possible candidate hypotheses or prune hypotheses during the single-shot relocalization step.

If no relocalization hypothesis was established between the captured image and the pre-built visual map, the self-relocalization system may cause the motion system to move (225) the sensor system and capture (210) a new snapshot to repeat the aforementioned processes.

In one or more embodiments, the single-shot relocalization result comprises up to the N-best hypotheses of the sensor system's current pose, where N is a positive integer number. Some exemplary embodiments for establishing hypotheses from a snapshot are disclosed later with reference to FIG. 3. In one or more embodiments, the up-to-N-best matches refers to the highest N scores or the lowest N uncertainty scores that pass an absolute threshold, a relative or ratio score, and/or other heuristic method(s) to select candidate hypotheses or eliminate obvious false hypotheses.

In response to up-to-N relocalization hypotheses existing, the self-relocalization system causes the motion system to move (230) the system to take additional visual measurement (235) in a new pose. In one or more embodiments, additional sensor data may also be captured at the new pose. In one or more embodiments, the trajectory of movement may be a pre-defined motion pattern comprising one or more 6-DOF movements, e.g., translation and panorama rotation. In one or more embodiments, the trajectory of movement may be dynamically generated based on all available visual maps, the up-to-N-best hypotheses, and/or other information from non-visual sensors.

In one or more embodiments, the up to the N-best hypotheses are refined (240) by using at least one of the movement trajectory and the additional visual measurement, to reject one or more relocalization hypotheses. In one or more embodiments, visual measurement captured in the new pose preferably overlaps with previous visual measurement(s) to facilitate a local SLAM process in the new pose for hypotheses refinement. Embodiments of detailed hypotheses refinement using a local SLAM process may be found with respect to FIG. 4. In one or more embodiment, the local SLAM can be replaced by a visual odometry or visual inertial odometry for hypotheses refinement. For a relocalization hypothesis, in one or more embodiments, all the collected visual measurements are matched against the visual map, and a local bundle adjustment is performed with the local SLAM result and its association to the fixed pre-built visual map. If the local bundle adjustment cannot converge or results in a large error after convergence, the relocalization hypothesis is rejected. For example, in one or more embodiments, a candidate hypothesis may be verified by superimposing the tracked movement trajectory with the winning hypothesis within the visual map. If the candidate hypothesis is a good candidate, the system's prior trajectory should align using the candidate hypothesis as an anchor point or reference point in the visual map. Furthermore, the visual measurement taken at the new pose should match well against existing 3D landmarks that should be observed at the estimated location in the visual map.

After each refinement, the self-relocalization system checks (245) whether a winner hypothesis exists. If not, the process goes back to step 220 to repeat the aforementioned processes. If there is a winning hypothesis, the self-relocalization system finishes (250) the discover mode and outputs a refined relocalization pose. The refined relocalization pose may be used as a pose prior for other location-based services.

In one or more embodiments, an adjustable confidence level may be used to determine when the relocalization is finished and output the localization result with respect to the visual map.

Figure 3:
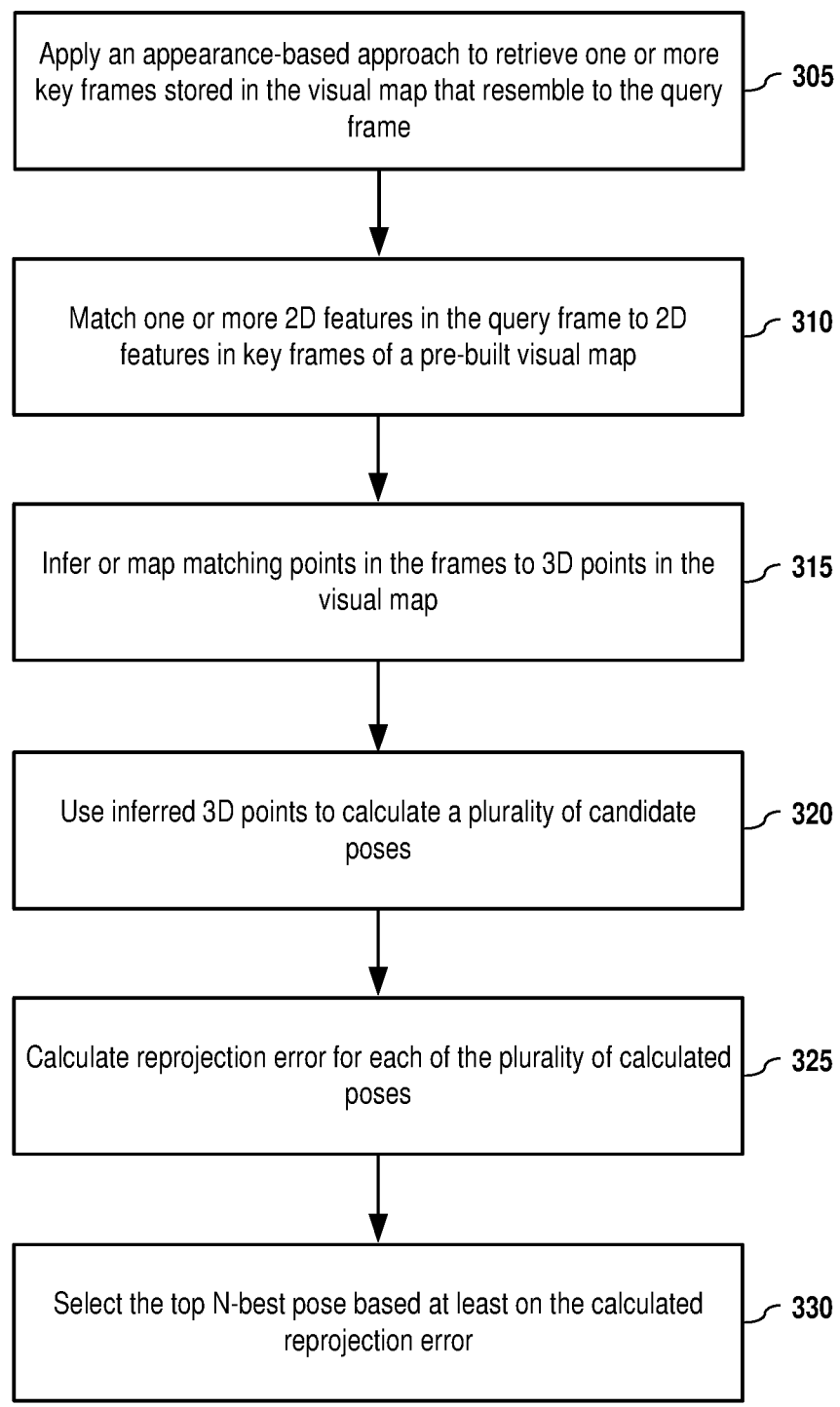
FIG. 3 depicts a process for establishing hypotheses from a snap shot, according to embodiments of the present document.

FIG. 3 depicts a process for establishing candidate hypotheses for a given query snapshot or frame, according to embodiments of the present document. First, an appearance-based approach is applied (305) to retrieve one or more key frames stored in the visual map that resemble to the query frame. In one or more embodiments, BOW and/or deep learning-based approaches may be used to implement the key frame retrieval. In one or more embodiments, one or more two-dimensional (2D) features in the query frame are matched (310) to 2D features in the retrieved key frames of the pre-built visual map, which may be pre-stored within memory of the self-relocalization system or even in the cloud (e.g., online storage system). The matching points in the frames are inferred or mapped (315) to 3D points in the visual map. The 3D points are used to calculate (320) a plurality of candidate poses. In one or more embodiments, Perspective-n-Point (PnP) may be used to estimate the candidate poses given inferred 3D points in the visual map. Reprojection error may be calculated (325) for each of the plurality of candidate poses with respect to the snapshot. In one or more embodiments, the reprojection error represents a geometric error corresponding to the image distance between a projected point and a measured one. Based at least on the calculated reprojection error, the top-N candidate hypothesis poses may be selected (330) for the self-relocalization process, N being a positive integer number less than the number of the candidate poses. In one or more embodiments, the snapshot data may include information from non-visual sensors, e.g. GPS, UWB, or LIDAR, may also be used to facilitate the selection process.

Figure 4:
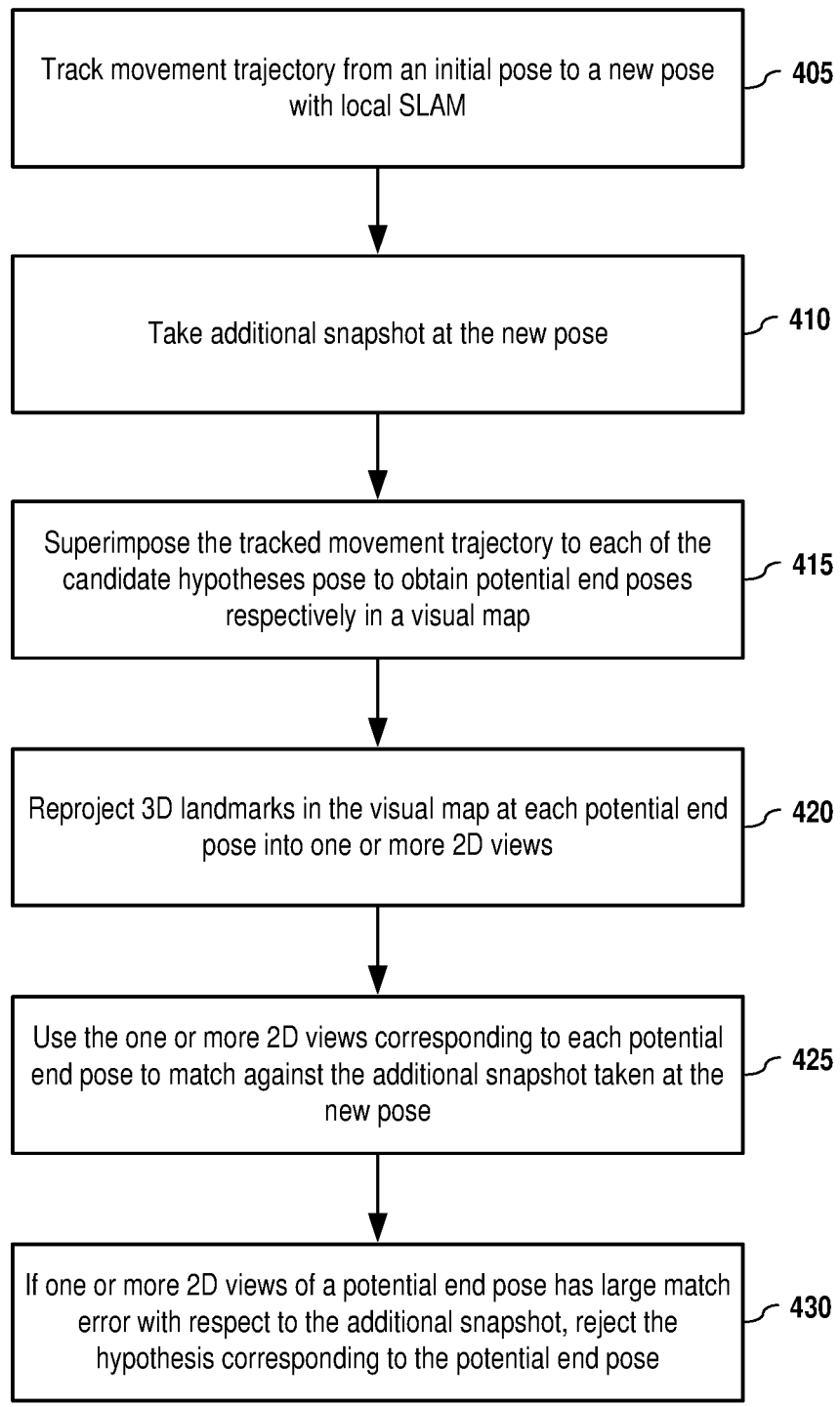
FIG. 4 depicts a process for hypotheses refinement processes, according to embodiments of the present document.

After candidate relocalization hypothesis established for an initial snapshot at an initial pose, the hypotheses may be refined. FIG. 4 depicts a process for hypotheses refinement processes, according to one or more embodiments of the present document. In one or more embodiments, the trajectory of movement may be a pre-defined motion pattern comprising one or more 6-DOF movements, e.g., translation and panorama rotation. In embodiments, the trajectory of movement may be dynamically generated based on the visual maps, the candidate hypotheses, and/or additional information from non-visual sensors. The movement trajectory of the one or more visual sensors may be tracked (405) with local SLAM via one or more non-visual sensors, e.g., GPS, UWB, wheel encoder, Lidar, etc., to record a relative displacement from the initial pose to one or more new poses where additional visual measurements are taken. Additional visual measurement (snapshot) is taken (410) using the one or more visual sensors at the new pose. In one or more embodiments, the tracked movement trajectory is superimposed (415) to each of the candidate hypotheses pose to obtain potential end poses in the pre-built visual map corresponding to the candidate hypotheses respectively. In one or more embodiments, the movement trajectory itself may be used for hypotheses refinement. For example, if the movement trajectory starts from one of the candidate hypotheses is obviously not compatible with the visual map, e.g., not allowed by or beyond boundary of the visual map, that candidate hypothesis may be rejected. In one or more embodiments, the hypotheses rejection due to incompatible trajectory may be implemented before relocalization verification for potential end poses to simplify relocalization calculation process. In one or more embodiments, 3D landmarks in the visual map at each of the obtained potential end poses are reprojected (420) into one or more 2D views. In one or more embodiments, the one or more 2D views corresponding to each potential end pose are used (425) for matching against the additional visual measurement taken at the new pose. If one or more 2D views of a potential end pose has large error with respect to the additional visual measurement, the corresponding hypothesis is rejected (430). In one or more embodiments, the error for rejection may be an absolute error threshold, a relative error threshold, or a combination thereof.

In embodiments, the above hypotheses refinement process may be repeated for each movement of the visual sensor until a winning hypothesis appears to end the discover mode. In embodiments, in case of all hypotheses being rejected due to large error, the self-relocalization process goes back to beginning with a snapshot with newly established top-N hypotheses for another round of self-relocalization process.

D. SYSTEM EMBODIMENTS

In one or more embodiments, aspects of the present patent document may use, may include, or may be implemented on one or more information handling systems/computing systems. For example, in one or more embodiments, the system 100 of FIG. 1 may utilize one or more components of the computing system 500 and/or may include or utilize cloud computing resources. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device that can host visual sensor(s) 110 and drives a motion system (130) and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 5:
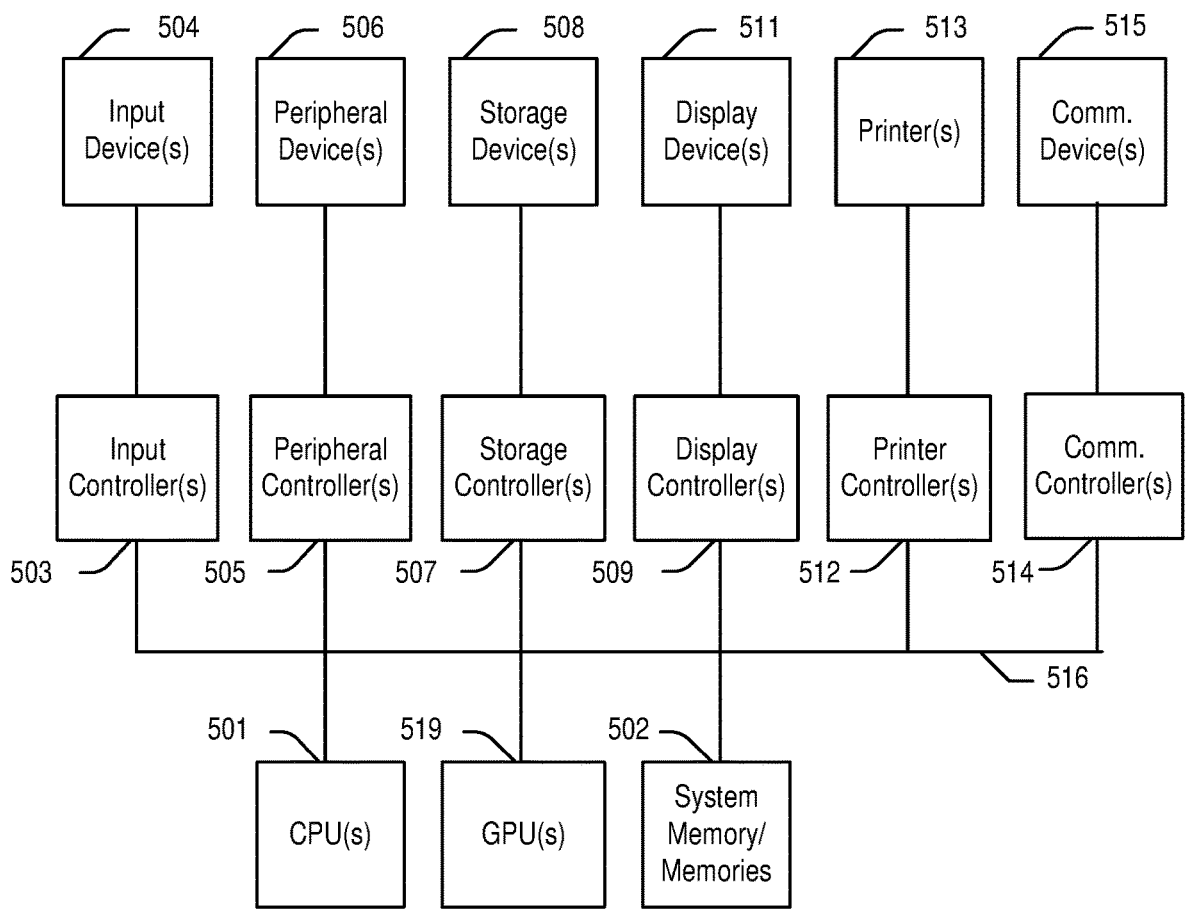
FIG. 5 depicts a simplified block diagram of a computing device/information handling system, in accordance with embodiments of the present document.

FIG. 5 depicts a simplified block diagram of a computing device/information handling system (or computing system) according to embodiments of the present disclosure. It will be understood that the functionalities shown for system 500 may operate to support various embodiments of a computing system—although it shall be understood that a computing system may be differently configured and include different components, including having fewer or more components as depicted in FIG. 5.

As illustrated in FIG. 5, the computing system 500 includes one or more central processing units (CPU) 501 that provides computing resources and controls the computer. CPU 501 may be implemented with a microprocessor or the like, and may also include one or more graphics processing units (GPU) 519 and/or a floating-point coprocessor for mathematical computations. System 500 may also include a system memory 502, which may be in the form of random-access memory (RAM), read-only memory (ROM), or both.

A number of controllers and peripheral devices may also be provided, as shown in FIG. 5. An input controller 503 represents an interface to various input device(s) 504, such as a keyboard, mouse, touchscreen, and/or stylus. The computing system 500 may also include a storage controller 507 for interfacing with one or more storage devices 508 each of which includes a storage medium such as magnetic tape or disk, or an optical medium that might be used to record programs of instructions for operating systems, utilities, and applications, which may include embodiments of programs that implement various aspects of the present disclosure. Storage device(s) 508 may also be used to store processed data or data to be processed in accordance with the disclosure. The system 500 may also include a display controller 509 for providing an interface to a display device 511, which may be a cathode ray tube (CRT), a thin film transistor (TFT) display, organic light-emitting diode, electroluminescent panel, plasma panel, or other type of display. The computing system 500 may also include one or more peripheral controllers or interfaces 505 for one or more peripherals 506. Examples of peripherals may include one or more printers, scanners, input devices, output devices, sensors, and the like. A communications controller 514 may interface with one or more communication devices 515, which enables the system 500 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. In one or more embodiments, a cloud source may be utilized to run the relocalization computation excluding the local SLAM portion.

In the illustrated system, all major system components may connect to a bus 516, which may represent more than one physical bus. However, various system components may or may not be in physical proximity to one another. For example, input data and/or output data may be remotely transmitted, e.g. in real-time, from one physical location to another. In addition, programs that implement various aspects of the disclosure may be accessed from a remote location (e.g., a server) over a network. In one or more embodiments, data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for self-relocalization in a visual map, comprising:
   capturing a snapshot using at least one visual sensor at an initial pose;
   establishing a plurality of relocalization hypotheses in the visual map based at least on the snapshot;
   moving the at least one visual sensor from the initial pose to a new pose with a movement trajectory that is tracked;
   taking additional visual measurement at the new pose; and
   implementing hypotheses refinement by using at least one of the movement trajectory and the additional visual measurement, to reject one or more relocalization hypotheses by performing, for each relocalization hypothesis from a set of one or more relocalization hypotheses from the plurality of relocalization hypotheses, steps comprising:
      superimposing the movement trajectory to relocalization hypothesis to obtain a potential end pose in the visual map corresponding to the relocalization hypothesis;
      reprojecting three-dimensional (3D) landmarks in the visual map at the potential end pose into one or more two-dimensional (2D) views;
      using the additional visual measurement taken at the new pose and the one or more 2D views corresponding to the relocalization hypothesis to obtain a match error for the relocalization hypothesis; and
      rejecting the relocalization hypothesis responsive to the relocalization hypothesis meeting a rejection error that is based at least on match error.

2. The method of claim 1, further comprising:
   outputting a winning hypothesis among the plurality of relocalization hypotheses with a refined relocalization pose, which is obtained by superimposing the movement trajectory with the winning hypothesis.

3. The method of claim 2, wherein hypotheses refinement is implemented by using both the movement trajectory and the additional visual measurement.

4. The method of claim 1, further comprising:
   in response to the plurality of relocalization hypotheses rejected in total, moving the at least one visual sensor to capture a new snapshot with new relocalization hypotheses for next round of self-relocalization.

5. The method of claim 1, wherein establishing the plurality of relocalization hypotheses comprising:
   applying an appearance-based approach to retrieve one or more frames stored in the visual map that resemble the snapshot;
   matching one or more two-dimensional (2D) features in the snapshot to 2D features in the frames of the visual map;
   inferring or mapping the matching 2D features in the frames to three-dimensional (3D) points in the visual map;
   using the 3D points to calculate a plurality of candidate poses;
   calculating reprojection error for each of the plurality of candidate poses; and
   based on at least the calculated reprojection error, selecting one or more candidate poses as the hypotheses.

6. The method of claim 1, wherein the movement trajectory is tracked using non-visual sensors.

7. The method of claim 1, wherein implementing hypotheses refinement further comprises:
   for a relocalization hypothesis from the plurality of relocalization hypotheses, rejecting the relocalization hypothesis responsive to the movement trajectory starting from the relocalization hypothesis not being compatible with the visual map.

8. The method of claim 1, wherein the rejection error is compared to an absolute error threshold, a relative error threshold, or a combination thereof.

9. A system for self-relocalization in a pre-built visual map, comprising:
   at least one visual sensor for visual measurement;
   a motion system to move the at least one visual sensor;
   one or more processors communicatively coupled to the at least one visual sensor and the motion system; and
   a non-volatile memory storing one or more instructions which, when executed by at least one processor, causing steps to be performed comprising:
      instructing the at least one visual sensor for visual measurement at a first pose;
      implementing single-shot relocalization to localize the system with respect to a pre-built visual map using the visual measurement at the first pose to obtain a localization result comprising candidate relocalization hypotheses;
      instructing the motion system to move the at least one visual sensor from the first pose to a second pose with a movement trajectory that is tracked;
   instructing the at least one visual sensor for visual measurement at the second pose; and
      implementing hypotheses refinement, by using at least one of the movement trajectories and the visual measurement taken at the second pose, to reject one or more candidate relocalization hypotheses by performing, for at least one or more candidate relocalization hypotheses, steps comprising:
         superimposing the movement trajectory to the candidate relocalization hypothesis to obtain a potential end pose in the pre-built visual map corresponding to the candidate relocalization hypothesis;
         reprojecting three-dimensional (3D) landmarks in the pre-built visual map at the obtained potential end pose into one or more two-dimensional (2D) views;
         using the visual measurement taken at the second pose and the one or more 2D views to obtain a match error; and
         rejecting the candidate relocalization hypothesis responsive to the candidate relocalization hypothesis satisfying an error threshold that is based at least on match error.

10. The system of claim 9, wherein the non-volatile memory further stores one or more instructions which, when executed by at least one processor, causing steps to be performed comprising:
in response to zero relocalization hypotheses being established at the first pose:
instructing the motion system to move the at least one visual sensor from the first pose to a subsequent pose with a movement trajectory that is tracked;
instructing the at least one visual sensor for visual measurement at the subsequent pose; and
re-implementing the single-shot relocalization to localize the system in the pre-built visual map using the visual measurement at the subsequent pose.

11. The system of claim 9, wherein the candidate relocalization hypotheses are hypotheses with a highest N scores or a lowest N uncertainties that pass an absolute error threshold, an error score ratio test, a heuristic algorithm, or a combination thereof, to prune obvious false hypotheses, N being an positive integer number.

12. The system of claim 9, wherein the system further comprises at least one non-visual sensor configured to track the movement trajectory of the at least one visual sensor.

13. The system of claim 9, wherein implementing hypotheses refinement further comprises:
for a candidate relocalization hypothesis:
rejecting the candidate relocalization hypothesis responsive to the candidate relocalization hypothesis and the movement trajectory not being compatible with the pre-built visual map.

14. The system of claim 9, wherein the error threshold is an absolute error threshold, a relative error threshold, or a combination thereof.

15. A method for self-relocalization in a pre-built visual map, comprising:
capturing a first snapshot using at least one visual sensor at a first pose;
implementing single-shot relocalization to localize at least one visual sensor in a pre-built visual map based at least on the first snapshot, the single-shot relocalization establishing a plurality of relocalization hypotheses of the at least one visual sensor at the first pose;
moving the at least one visual sensor from the first pose to a second pose with a movement trajectory that is tracked;
fusing the movement trajectory with each of the plurality of relocalization hypotheses to obtain one or more potential end poses in the pre-built visual map; and
implementing hypotheses refinement by using at least the movement trajectory, to reject one or more established relocalization hypotheses, wherein if the movement trajectory starting from one of the plurality of relocalization hypotheses is incompatible with the pre-built visual map, the relocalization hypothesis is rejected.

16. The method of claim 15, wherein establishing the plurality of relocalization hypotheses comprises rejecting obvious false hypotheses based on information from one or more non-visual sensors.

17. The method of claim 16, wherein the information from one or more non-visual sensors is global or relative position information.

18. The method of claim 15, wherein hypotheses refinement is implemented by using both the movement trajectory and additional visual measurement taken at the second pose, the hypotheses refinement further comprises:
reprojecting three-dimensional (3D) landmarks in the pre-built visual map at each obtained potential end pose into one or more two-dimensional (2D) views;
using the one or more 2D views corresponding to each potential end pose to match against the additional visual measurement taken at the second pose; and
rejecting one or more relocalization hypotheses based at least on their corresponding match errors satisfying a rejection threshold.

19. The method of claim 15, further comprising:
further moving the at least one visual sensor to repeat the fusing and hypotheses refinement processes until a last relocalization hypothesis; and
outputting a refined relocalization pose within the pre-built visual map, wherein the refined relocalization pose is obtained by superimposing the tracked movement trajectory with the last relocalization hypothesis.

20. The method of claim 15, further comprising:
in response to all relocalization hypotheses being rejected, moving the at least one visual sensor for new snapshot capturing, re-implementing single-shot relocalization to re-initiate self-relocalization.

* * * * *